United States Patent

[11] 3,548,852

| [72] | Inventor | Richard C. Fisher |
| | | Walnut Creek, Calif. |
| [21] | Appl. No. | 739,731 |
| [22] | Filed | June 25, 1968 |
| [45] | Patented | Dec. 22, 1970 |
| [73] | Assignee | The Rucker Company |
| | | a corporation |

[54] VALVE FOR ELECTRO VISCOUS FLUIDS
6 Claims, 6 Drawing Figs.

[52] U.S. Cl. .................................................... 137/81.5,
310/10
[51] Int. Cl. ....................................................... F15c 1/04
[50] Field of Search ............................................ 137/81.5, 2,
14, 251; 103/1M, 1E; 310/10, 5

[56] References Cited
UNITED STATES PATENTS

| 2,492,493 | 12/1949 | Misson | 103/1(E) |
| 2,652,778 | 9/1953 | Crever | 103/1(M) |
| 2,727,859 | 12/1955 | Freeborn | 103/1(E) |
| 3,327,223 | 6/1967 | Halista | 137/81.5X |
| 3,390,693 | 7/1968 | Ziemer et al. | 137/81.5 |
| 3,405,728 | 10/1968 | Dexter | 137/251 |
| 3,416,549 | 12/1968 | Chaney et al. | 137/81.5 |

*Primary Examiner*—Samuel Scott
*Attorney*—Lothrop & West

ABSTRACT: A valve for electro viscous fluids is disposed in an electro viscous fluid conduit and includes a pair of grids located upstream and downstream with respect to each other. The grids are mutually insulated electrically and are connected in a circuit which establishes an electrical voltage difference between the grids.

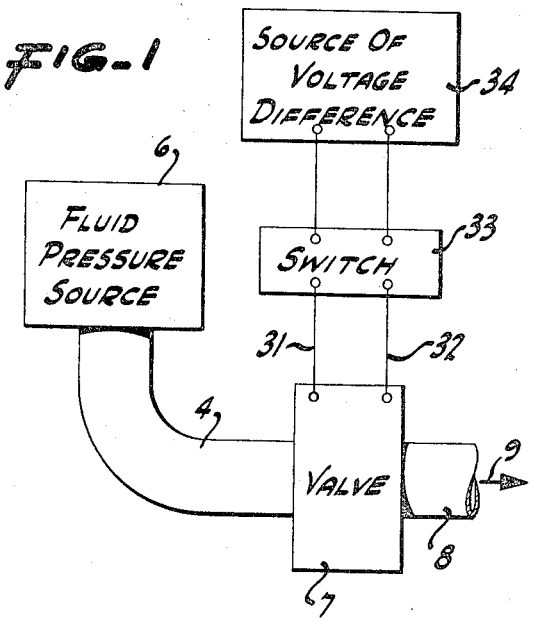
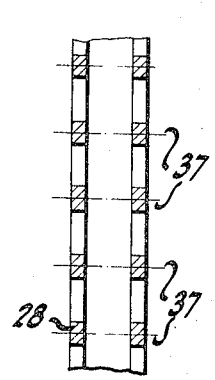
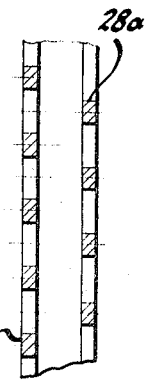
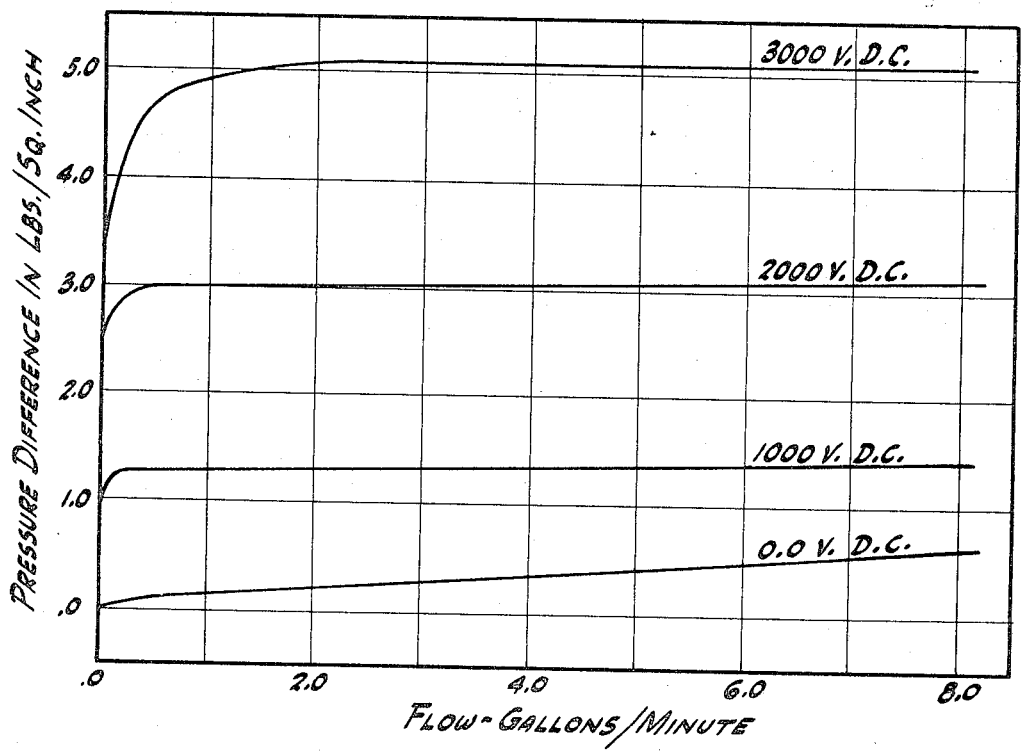

PATENTED DEC 22 1970

INVENTOR.
RICHARD C. FISHER
BY
Lothrop & West
ATTORNEYS 3,548,852

VALVE FOR ELECTRO VISCOUS FLUIDS

The handling of electroviscous fluids has been the subject of various patents (see Winslow U.S. Pat. No. 2,417,850) and literary references for the past 25 or 30 years. The literature has uniformly indicated that the valving or flow control of electroviscous fluids can be taken care of by means of a voltage difference establishing an electrical field extending normal to or across the direction of flow of the fluid. In fact, the references; i.e. "Electroviscous Fluids. I. Rheological Properties (pages 67—74); Electroviscous Fluids. II. Electrical Properties (pages 75—80) by Donald L. Klass and Thomas W. Martinek, Journal of Applied Physics, Jan. 1967, Vol. 38, No. 1," indicate that this is the only manner of controlling or valving flowing electroviscous fluid.

It is highly desirable to provide an improved control for the flow of electroviscous fluid in a conduit and in fact to provide a control effective to produce the desired amount of retention of the fluid in location under any stipulated amount of pressure drop in the conduit. The electrical control is applied in the most efficient manner possible in order to produce accurate, speedy and effective flow control between a substantially arrested condition of the fluid and a fluent or readily flowable condition of the fluid.

It is therefore an object of the invention to provide a valve for electroviscous fluids effective under relatively wide limits accurately to control the flow of the electroviscous fluid from substantially no flow to substantially maximum flow in the conduit with a corresponding accuracy and precision of electrical control.

Another object of the invention is to provide a valve for electroviscous fluids which can readily be incorporated in a standard conduit and which while effective to arrest or slow the flow does not materially interfere with unrestricted flow in the conduit.

Another object of the invention is to provide ways for increasing the options available for the control of electroviscous fluid in a conduit.

Another object of the invention is effectively and efficiently to use electrical power to provide a sensitive and accurate control of an electroviscous fluid.

Another object of the invention is in general to provide an improved valve for controlling the flow of electroviscous fluid.

A still further object of the invention is to provide a valve for controlling electroviscous flow so effectively and efficiently as to permit material reduction in the size of the valve and control instrumentalities as compared to those heretofore used.

Other objects of the invention together with the foregoing are set forth in the accompanying description and are illustrated in the accompanying drawings, in which:

FIG. 1 is a diagrammatic showing of an electroviscous fluid valve installed in an operating environment;

FIG. 4 is an enlarged detail showing in cross section one arrangement of grid structure pursuant to the invention;

FIG. 5 is a view similar to FIG. 4 but showing a different arrangement of grids pursuant to the invention; and FIG. 6 is a plot of quantity of electroviscous fluid flow in a conduit in gallons per minute as abscissae against pressure difference in pounds per square inch as ordinates, the curves being indicated pressure flow relationships for several values of voltage difference in a control valve.

Figure 2:
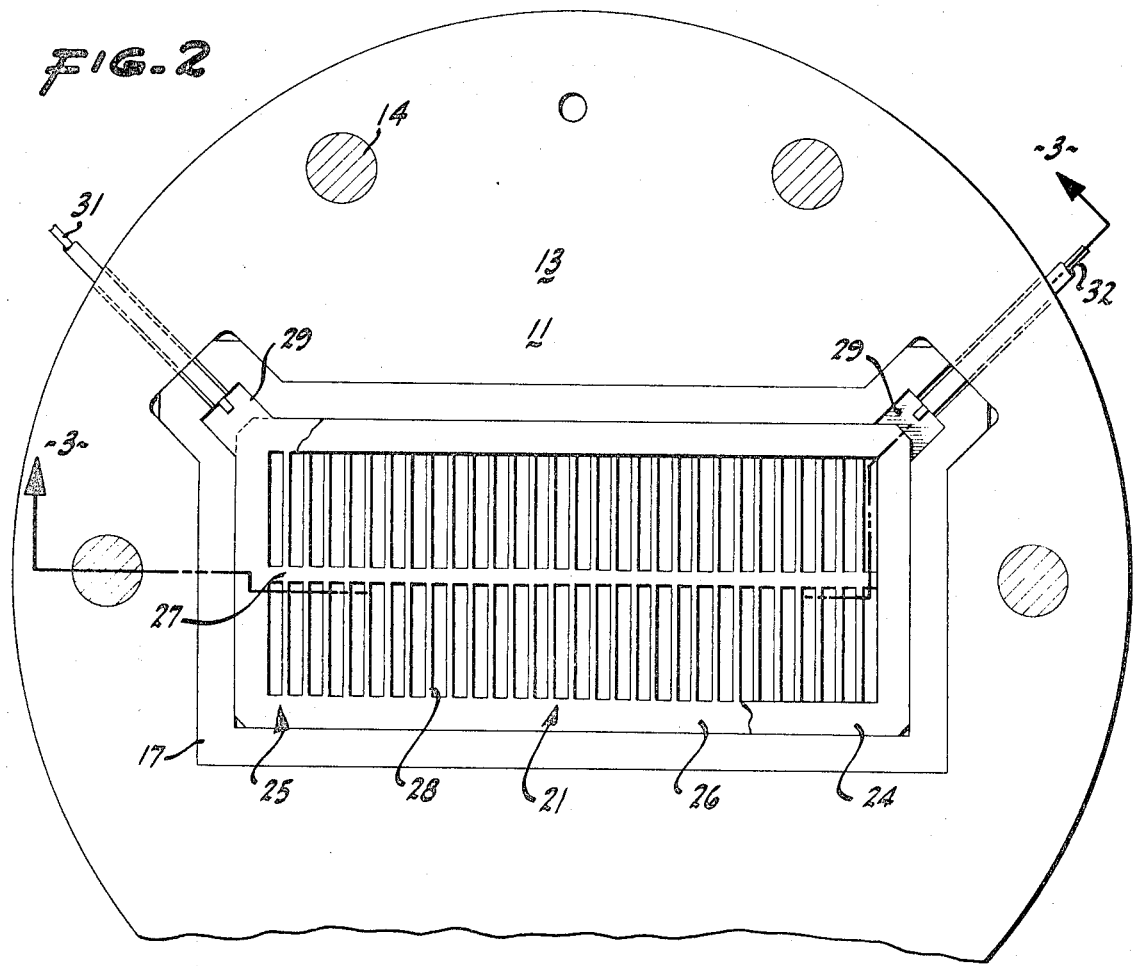
FIG. 2 is a cross section transversely of the conduit through the valve of FIG. 1 showing the arrangement of the valve and its major electrical connections, a portion of the structure being broken away to reduce the size of the FIG.

Since U.S. Pat. No. 2,417,850 of Winslow which first disclosed electroviscous fluids, there has been a great deal of theoretical and technical work done toward improving the fluids themselves, toward handling them better and particularly toward controlling electroviscous fluid flow by means of valves. Flow control is exerted by means of electrical fields established in the flow region with the field direction arranged generally normal to or transversely of the general direction of fluid flow.

In endeavoring to improve upon the results of the prior art and particularly in endeavoring to design an electroviscous fluid valve which could be made small enough and light enough and would work effectively enough to be used as a valve for an implanted heart pump mechanism, my investigation indicated, contrary to the teachings of the publications in this field, that it is possible and advantageous to provide an electric voltage difference in the region of flowing electroviscous fluid with the voltage difference being measured or the field direction being established in or along the direction of fluid flow rather than in a direction at right angles thereto. Highly effective and efficient control of the flow can be established in this manner.

In an actual embodiment constructed pursuant to the investigation, there is provided a conduit 4 FIG. 1) extending from a fluid pressure source 6. Electroviscous fluid is discharged through the conduit 4 and through a valve housing 7 to a downstream or outflow conduit extension 8, the general flow direction being as indicated by the arrow 9 of FIG. 1.

Figure 3:
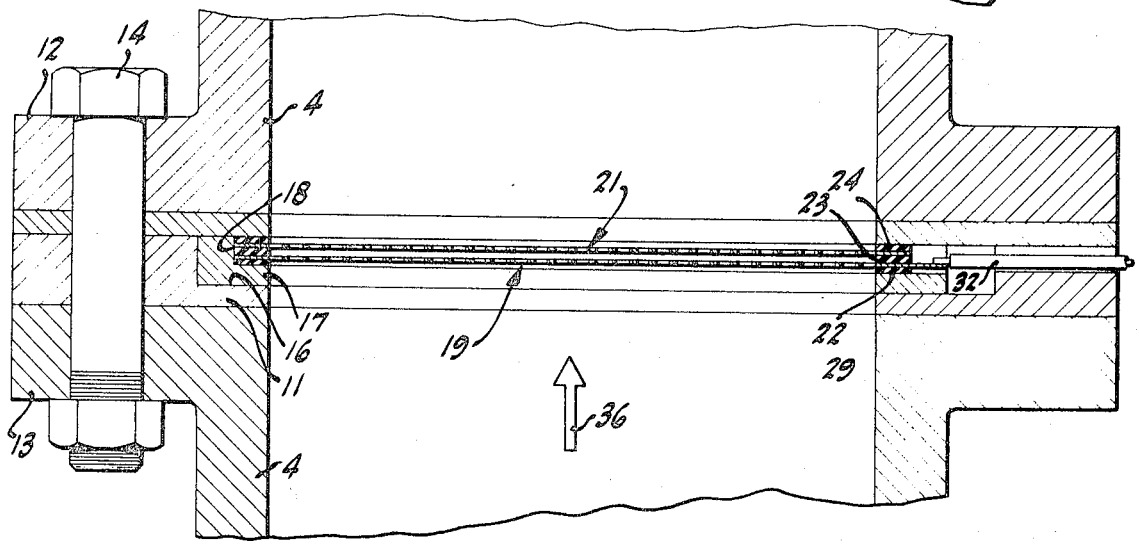
FIG. 3 is a cross section, the planes of which are indicated by the lines 3–3 of FIG. 2.

Pursuant to the invention there is included in the conduit 4 (FIG. 3) a valve section 11 clamped between standard flanges 12 and 13 by a ring of securing bolts 14. The section 11 is provided with a cutout 16 or recess. Within the recess there is disposed an electrically insulating frame 17 in its turn having a chamber 18 adapted to receive an upstream grid 19 and a downstream grid 21 with a plurality of electrical insulators 22, 23 and 24 interspersed with the grids. Since the grids are substantially identical except for a reversal in position, a description of one applies equally to the other.

Each of the grids includes a metallic or electrically conducting, platelike member 25 preferably formed by a photo etching process. Each member has a peripheral frame 26, one or more central ribs 27 (depending upon width), a plurality of crossbars 28 and a corner tab 29. All of these parts are integrally connected for good electrical conduction. Each of the grid bars 28 (shown in enlarged cross section in FIG. 4) is preferably of generally rectangular cross section with relatively sharp corners. The shape is contrary to any streamlined or nonperturbing fluid flow forms. Rather, the abrupt surface intersections and generally planar upstream and downstream faces provide substantial turbulence in the fluid passing thereover, even at quite low flow rates.

The upstream grid 19 and the downstream grid 21 are assembled with their interspersed insulators within the recess 16 so that the corner tab on the upstream grid extends to one conductor 31 emerging from the section 11, while the corner tab 29 on the adjacent grid extends to a conductor 32 emerging from the section 11. The conductors 31 and 32 extend to an on-off switch 33 controlling a circuit extending from a source 34 of voltage difference (FIG. 1). The arrangement is such that when the switch 33 is open both of the grids 19 and 21 have substantially the same voltage and produce substantially no electrical field. On the other hand, when the switch 33 is closed, the source of voltage difference 34 is effective to provide a different voltage on the grid 19 than exists on the grid 21 so that there is a substantial voltage difference between them. This gives rise to an electrical field within the conduit and with the field direction extending from the grid bars 28 on one of the grids to the adjacent ones of the grid bars on the other of the grids, so that the electrical field so set up extends generally parallel to the direction of fluid flow within the conduit, as indicated by the arrow 36 (FIG. 3) and the field lines 37 in FIG. 4.

As an alternate arrangement, as shown in FIG. 5, the bars 28 in one of the grids may be arranged in a staggered relationship with respect to the similar bars 28a in the other grid. In this latter instance, the electrical field between the grids, although extending generally in the direction of the flow arrow 36, does have a lateral or transverse component, but the resultant generally is in the direction of fluid flow. Wherein the field is characterized herein as being in the direction of the fluid flow, it is intended to include an electrical field as set up by the grid bars as shown in FIG. 4 as well as a field as set up by the grid bars as shown in FIG. 5.

In the operation of this device, when there is no voltage difference between the grids 19 and 21 and an electroviscous fluid is flowing in the conduit 4 to the outlet 8 through the valve section 11, the character of the flow even at relatively low gross flow rates nevertheless is not laminar in the vicinity of the grids 19 and 21. Because of the number, location and configuration of the grid bars, flow entirely across the conduit becomes at least mildly turbulent or nonlaminar. Reference to "no" voltage difference is to no voltage difference due to the voltage source 34. When the electroviscous fluid is turbulent or in motion some tiny currents in and voltage differences between the grids can be measured, apparently generated by the fluid flow. These are not the voltage differences relied upon for flow control.

When the switch 33 is closed a voltage difference then exists between the grids 19 and 21. Which grid has the higher voltage is not consequential and the higher voltage may alternate from one grid to the other. In any case of voltage difference a corresponding electrical field is set up between the various bars 28 (or 28 and 28a). The field has the general direction of the conduit axis. The field is effective upon the eddying electroviscous fluid to inhibit or restrict the flow thereof in a downstream direction.

The nature of this effect in an actual device of a certain diameter is as illustrated in the graph in FIG. 6. When the voltage difference is zero between the two grids 19 and 21 and the flow in gallons per minute varies from 0 to 8 or so, as represented by the lowermost curve in FIG. 6, then the pressure drop or difference across the valve, i.e. between the two grids varies accordingly between 0 and about seven-tenths of a pound per square inch.

When the voltage difference between the grids is established at 1,000 volts (direct current) and the flow through the valve is varied between 0 and about 8 gallons per minute, the pressure drop across the grids, as illustrated by the curve labeled "1000 V.D.C." in FIG. 6, varies from virtually 0 to about 1 4/10 pounds per square inch.

Comparably, when there is a difference of 2000 volts between the grid plates 19 and 21 and the flow rate varies as before, the pressure drop across the grids rises quite steeply from 0 and then approximates 3 pounds per square inch, as shown by the curve labeled "2000 V.D.C." in FIG. 6.

Finally, as indicated by the top curve in FIG. 6, when the flow rate varies between 0 and about 8 gallons per minute and the voltage difference across the grids is 3000 volts direct current, then the pressure difference across the two grids ranges from 0 at zero flow rate to a substantially constant value of about 5 pounds per square inch above about 2 gallons per minute.

It is noted that at increasing flow rates the pressure difference across the grids tends to become more nearly constant. The number of grids is by no means limited to two since three and more grids have been used in practice. Increasing the number of grids does not alter the basic operation but does increase the pressure drop across the valve at all excitation voltages and does increase the slope of the 0.0 volt curve.

Contrary to the teachings of the prior art, it is demonstrated that it is not essential that a controlling electrical field be set up in a direction normal to the direction of flow of an electroviscous fluid. Rather, an electroviscous fluid can be well and adequately controlled with an electrical field extending in the direction of flow, particularly provided that the means or grids utilized to establish the field and its direction are of a cross-sectional shape or are of a character to produce nonlaminar or turbulent fluid flow or that the flow for any reason is other than purely laminar.

I claim:

1. A valve for electroviscous fluids comprising a conduit for electroviscous fluid flowing therein in a predetermined direction, an upstream grid fixed in and extending substantially across said conduit, a downstream grid fixed in and extending substantially across said conduit and spaced from said upstream grid in said direction, both of said grids including bars immersed in electroviscous fluid flowing in said conduit, and means for establishing an electrical voltage difference of the order of hundreds of volts between said upstream and downstream grids whereby to establish an electric field extending generally in such direction.

2. A valve as in claim 1 in which said bars are of a configuration favoring turbulent flow of said fluid in said conduit.

3. A valve as in claim 1 in which said grids are far enough apart to inhibit arcing between said grids under said voltage difference in the presence of said electroviscous fluid.

4. A valve as in claim 1 in which said grids have a predetermined thickness and are spaced apart a distance approximately equal to said thickness to engender a compact electrical field between said grids in said direction and in the presence of said electroviscous fluid.

5. A valve as in claim 1 in which each of said grids includes a plurality of closely spaced bars extending transversely of the direction of electroviscous fluid flow in said conduit and at least some of said bars have a shape tending to produce turbulent flow of said electroviscous fluid.

6. A valve as in claim 1 in which said bars on one of said grids are out of registry in the direction of fluid flow with said bars on the other of said grids.